Jan. 17, 1961 K. GEBELE 2,968,229
PHOTOGRAPHIC CAMERA SETTING MEANS
Filed March 31, 1958 2 Sheets-Sheet 2

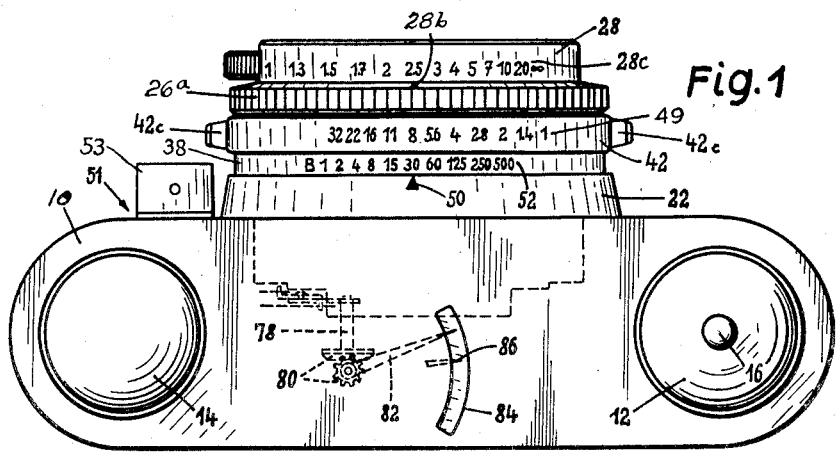
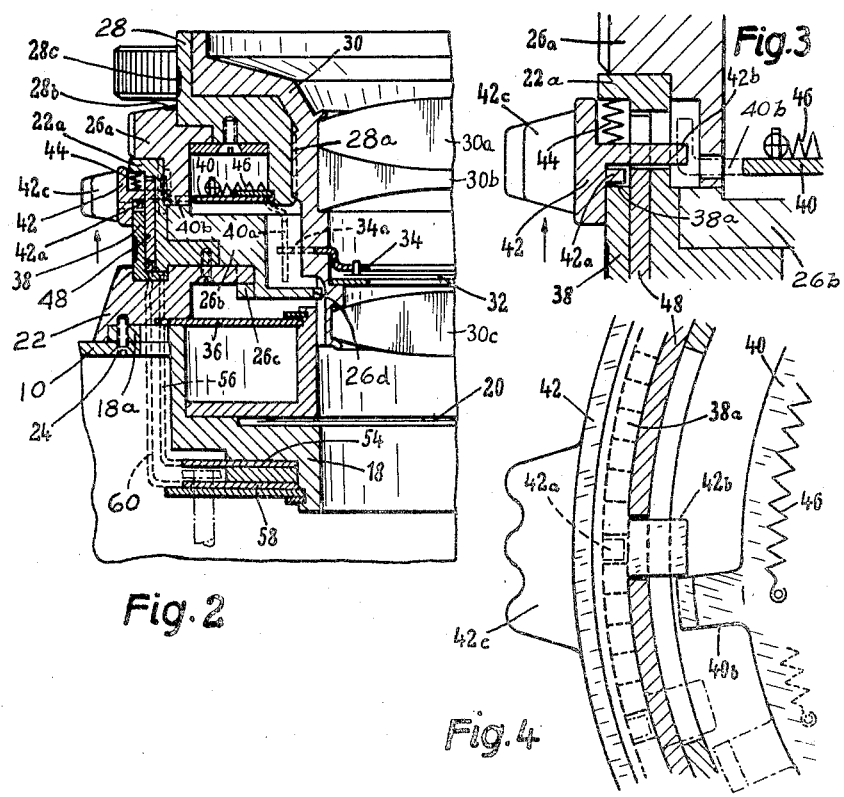

United States Patent Office
2,968,229
Patented Jan. 17, 1961

2,968,229

PHOTOGRAPHIC CAMERA SETTING MEANS

Kurt Gebele, Munich, Germany, assignor to Compur-Werk Friedrich Deckel O.H.G., Munich, Germany, a firm of Germany Filed Mar. 31, 1958, Ser. No. 724,945

Claims priority, application Germany Apr. 12, 1957

1 Claim. (Cl. 95—64)

The present invention relates to means for setting the settable or adjustable members of a photographic camera, such as the shutter speed setting member and the diaphragm aperture setting member, preparatory to making the actual exposure.

An object of the invention is the provision of generally improved and more satisfactory setting means.

Another object is the provision of setting means of simplified form having only one member to be manipulated by the user for setting both the shutter speed and the diaphragm aperture, so that the user, particularly if inexperienced, is less likely to be confused or to operate the parts in a faulty manner, than when separate manipulating members are provided for speed and aperture settings.

Another object is the provision of setting means so designed and constructed as to have a neat, simplified, and streamlined external appearance consistent with the appearance which is desired in modern cameras.

These and other desirable objects may be attained in the manner disclosed as an illustrative embodiment of the invention in the following description and in the accompanying drawings forming a part hereof, in which:

Fig. 1 is a top plan view, somewhat diagrammatic or schematic, of a camera having setting means in accordance with a preferred form of the present invention;

Fig. 2 is a fragmentary radial section taken axially through a portion of the shutter unit and lens unit and adjacent parts of the camera body;

Fig. 3 is a view similar to a fragment of Fig. 2 on a larger scale, illustrating additional details;

Fig. 4 is a fragmentary transverse section through part of the construction shown in Fig. 3;

The same reference numerals throughout the several views indicate the same parts.

Figure 6:
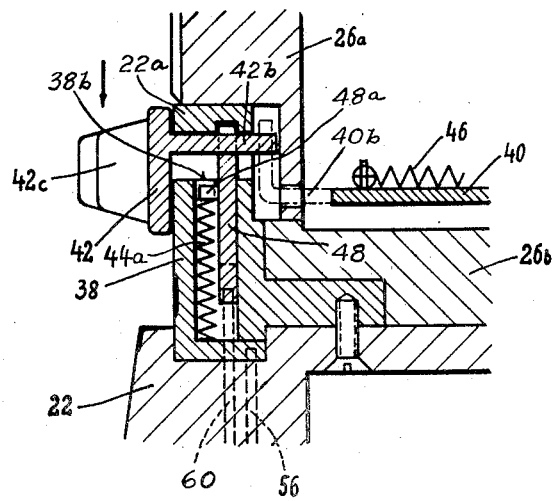
Fig. 6 is a view similar to Fig. 3, illustrating a modified construction.

Referring first to Fig. 1, there is shown a camera having a body indicated in general at 10, provided with the usual film winding or transport knob 12, a film rewinding knob 14, and a shutter release plunger 16. In the manner well known in the art, the shutter is cocked or tensioned by rotation of the film transport knob 12, ready for making an exposure, and is released or triggered for the beginning of the actual exposure by depressing the release plunger 16.

The shutter itself, mounted on the front of the camera, is of the objective type, and may be of conventional construction except for the various features specially disclosed herein. The shutter housing is indicated in general at 18, and is provided with the usual pivoted shutter blades 20 which swing between open and closed positions, the open positions of the blades allowing passage of light along the optical axis through the central aperture which extends through the shutter, the shutter housing being of the conventional annular shape surrounding the exposure aperture. The mechanism for driving the shutter blades 20 to open and close them is arranged in the usual annular space between the outer wall of the shutter and the inner wall which defines the exposure aperture. The blades driving mechanism is conventional, and the details thereof are unimportant so far as the present invention is concerned. Thus the shutter blades may be driven through their opening and closing movements by mechanism of the type disclosed, for example, in Deckel and Geiger Patent 1,687,123, granted October 9, 1928, or of the types disclosed in copending patent applications of Kurt Gebele, Serial No. 514,218, filed June 9, 1955 (issued on August 25, 1959, as Patent 2,900,885), and Serial No. 520,875, filed July 8, 1955 (issued on August 25, 1959, as Patent 2,900,886).

The shutter housing or casing 18 has an annular flange 18a extending radially outwardly from the main body of the casing, near the forward edge thereof, and lying against the front wall of the camera body 10, to which it is secured as by screws 24, and also by an overlying bayonet mounting ring 22 of annular form which is secured to the front of the camera body concentrically with the optical axis. The bayonet mounting ring serves to hold detachably and interchangeably a two-part lens mount having main portions 26a and 26b, the latter carrying at its rear end the bayonet connection lugs 26c which mate with the bayonet lugs on the ring 22 in the usual conventional manner, enabling the detachable lens mount 26a, 26b to be secured firmly to the camera by bringing it axially against the camera and then rotating it about the optical axis through a fraction of a revolution in one direction, and enabling the lens mount to be removed from the camera by rotating it a fraction of a revolution in the opposite direction and then moving it in an axial direction away from the camera. The forward portion 26a of the lens mount has a circumferential rib which is serrated or knurled for easy grasping to turn the lens mount when attaching it to or detaching it from the camera.

The focus adjusting ring 28 is mounted on the forward lens mount section 26a for rotation about the optical axis as a center, but is held against axial movement relative to the lens mount. The focus adjusting ring 28 has an internal screw thread 28a mating with a corresponding external screw thread on the lens tube 30 which is held against rotation by a projection 26d on the lens mount section 26b engaging in an axial groove of the lens tube 30. Thus as the focus adjusting ring 28 is turned, the lens tube 30 cannot turn with it and so the screw threads 28a cause the lens tube to move axially in one direction or the other, carrying with it the lens components or elements of any desired number, three such lens components being illustrated at 30a, 30b, and 30c. The distance for which the lens is focused at any given moment is indicated by a focus distance scale 28c marked on the periphery of the focus adjusting ring 28 and read in conjunction with a fixed reference mark or pointer 28b on the lens mount portion 26a. The scale 28c is graduated in any convenient units of distance, such as feet, yards, or meters, graduations in meters being here illustrated.

For convenience of description, the shutter unit 18, etc., together with the detachable and interchangeable lens unit 26a, 26b, 30, etc., may be collectively referred to as the shutter assembly.

In the axial space between two of the lens components there is installed the usual conventional adjustable diaphragm, e.g., an iris diaphragm of known type, having adjustable leaves or blades 32, which can be set to different apertures by turning the internal diaphragm adjusting ring 34 which rotates, as usual, about the optical axis. When the interchangeable lens unit is removed from the shutter unit, the diaphragm stays with the lens unit and comes away from the camera with it.

In order to adjust the shutter mechanism to different shutter speeds or exposure times, there is employed a shutter speed adjusting ring 36 which, as customary in objective shutters, rotates about the optical axis as a center, and is located near the front of the main shutter housing or casing. In the present construction, this ring 36 is enclosed or covered by the bayonet mounting ring 22 so that the ring 36 is not directly accessible for manual actuation. Therefore, the ring 36 is connected by any suitable arm or stud to an external shutter speed setting ring 38 which rotates coaxially with the ring 36, likewise about the optical axis as a center, rotating around the outside of a forward extension or flange 22a mounted on and secured by screws to the bayonet mounting ring 22.

The diaphragm aperture adjusting ring 34 is connected for rotation with a second aperture adjusting ring 40 which is located within the detachable lens mount 26a, 26b and likewise rotates about the optical axis as a center. The ring 34 is carried by the lens tube 30 and moves axially with the lens tube when the lens is focused, whereas the ring 40 does not move axially during focusing. Therefore the two rings 34 and 40 are connected to each other in such manner that they will always rotate together but are free to move axially with respect to each other. For example, the ring 34 may have a radially extending arm 34a which extends into an axially extending slot in a rearwardly bent arm 40a of the ring 40.

This ring 40 constitutes an intermediate diaphragm aperture member, and it is coupled, in turn, by other means further described hereafter, to an external and manually accessible diaphragm aperture adjusting ring 42 which rotates around the outside of the structure and which is provided with one or more convenient operating handles or finger pieces, two such finger pieces 42c being shown at diametrically opposite points on the ring. This ring 42 is mounted for limited movement in an axial direction with respect to the stationary bayonet mount members 22 and 22a, and is constantly pressed rearward in an axial direction by a series of springs 44 located at intervals around the periphery of the ring and pressing rearwardly on an inward radial flange of the ring 42 and reacting forwardly against an outward radial flange at the forward end of the part 22a of the bayonet mounting ring structure, so as to tend to keep a tooth 42a on the ring 42 seated in one or another of a series of notches or recesses 38a formed in the front edge of the previously mentioned ring 38 which, it will be remembered, is coupled to turn with the internal shutter speed adjusting ring 36.

Thus when the operator grasps the finger pieces or handles 42c and rotates the ring 42 about the optical axis as a center, without imparting any axial motion to this ring, the rotation of the ring 42 will be accompanied by corresponding rotation of the ring 38, on account of the coupling tooth 42a being seated in one or another of the notches 38a of the ring 38. In this way, the diaphragm aperture and the shutter speed are simultaneously adjusted in a complementry manner without altering the exposure value for which the mechanism is set. The shutter speed adjusting mechanism and the diaphragm aperture adjusting mechanism are, for this purpose, designed so that rotary movements of the rings 34 and 36 through equal angles in the same direction will serve to adjust shutter speed and diaphragm aperture to a complementary extent, so that the change in aperture compensates for the change in shutter speed, or vice versa. This concept of designing the shutter speed mechanism and diaphragm aperture mechanism so that equal rotation makes compensating changes, is fully explained in the U.S. patent application of Kurt Gebele, Serial No. 389,775, filed November 2, 1953, issued as Patent 2,829,574, on April 8, 1958.

If, however, forward pressure is exerted on the finger pieces 42c before turning the ring 42, to displace the ring and pull the tooth 42a out of the notch or recess 38a in which it was seated, then the rotation of the ring 42 will adjust merely the diaphragm aperture without causing any adjustment of the shutter speed mechanism. In this way, the exposure value represented by the combination of shutter speed setting and diaphragm setting can be changed at will. When the forward axial pressure on the finger pieces 42c of the ring 42 is relaxed, the springs 44 will automatically move the ring 42 axially rearwardly again and couple it effectively to the ring 38, so that subsequent rotation of the ring 42 will alter both the diaphragm aperture and the shutter speed, without changing the exposure value.

When the lens mount parts 26a and 26b are removed in order to be interchanged with a different lens mount, the rings 34 and 40 stay with the lens mount and thus are removed from the camera, while the rings 38 and 42 stay on the camera, being permanently mounted on the bayonet mounting parts 22, 22a. Therefore, the following coupling mechanism is provided in order to couple the rings 34, 40 of the interchangeable lens mount with the ring 42 on the camera and to insure that the lens mount can be properly removed from or replaced on the camera in any position of adjustment of the diaphragm aperture, without having to pay attention to setting the diaphragm aperture to any particular value before removing or replacing the interchangeable lens unit. The ring 40 is provided with an arm 40b which extends first radially and then forwardly for a slight distance, as best seen in broken lines in Fig. 3. This arm 40b lies in the path of an arm 42b extending radially inwardly from the ring 42, as also seen in Fig. 3, the relationship of the parts 40b and 42b being illustrated also in Fig. 4. A spring 46, connected at one end to the ring 40 and at the other end to a fixed part of the interchangeable lens mount, constantly tends to turn the ring 40 in a clockwise direction (when viewed from the front as in Fig. 4) so as to keep the arm 40b of the ring abutting against the edge of the arm 42b on the ring 40. Thus if the ring 42 is turned in a clockwise direction, the spring 46 causes the ring 40 to follow along with it. If the ring 42 is turned in a counterclockwise direction, it will of course displace the ring 40 in a counterclockwise direction, stretching or tensioning the spring 46. Thus the rings 40 and 42 may be said to be coupled to each other by force-coupled means, as distinguished from the form-coupled means which is used for coupling the ring 34 to the ring 40.

Preferably the clockwise turning of the ring 40 increases the size of the diaphragm aperture, and counterclockwise turning reduces the aperture, although these motions could be reversed if desired.

In order to enable engagement and disengagement of the interchangeable lens in any position of adjustment of the diaphragm, the parts are so designed that the degree of angular rotation of the bayonet lugs, required to disengage the interchangeable lens mount, is greater than the maximum degree of rotation of the ring 40 during travel thereof through its extreme range from maximum aperture to minimum aperture or vice versa. Also, the orientation of the range of movement of the entire lens mount when engaging or disengaging it from the camera, is so chosen that the turning of the lens mount to disengaged position will in every case carry the arm 40b of the ring 40 to a position which is beyond (i.e., counterclockwise from) any possible position of the arm 42b on the ring 42. With this arrangement, no matter in what position the ring 42 happens to be set, the twisting of the lens mount to release the bayonet connection will carry the arm 40b a little beyond the position of contact with the arm 42b even if the latter is in its extreme position at one end of its range of travel, e.g., the minimum aperture end of its range as seen for example in broken lines in Fig. 4. Of course as the lens mount is twisted in this manner, the spring 46 carries the ring 40 to one end of its range of travel, preferably the end corresponding to maximum aperture of the diaphragm, which position is shown in broken lines in Fig. 4. When the twisting motion is completed and the axial motion of the lens mount away from the camera body takes place, the arms 40b and 42b are thus out of contact with each other. Similarly, when another lens mount intended for this particular camera is inserted axially into the bayonet ring, its corresponding arm 40b will (under the influence of its spring 46) be in a position spaced counterclockwise from any possible position of the arm 42b on the camera, so that the subsequent clockwise twisting of the lens mount to engage the bayonet lugs will bring the arm 40b on the lens mount into contact with the arm 42b on the camera. At the end of the twisting-on operation, the ring 40 in the lens mount will have been set automatically to whatever position of diaphragm adjustment was indicated by the previously set position of the ring 42 on the camera body.

There is preferably a releasable latch for holding the interchangeable lens unit against rotation, when it is secured in mounted position on the bayonet lugs of the camera body, to prevent accidental disengagement.

In the embodiment illustrated, the diaphragm aperture value for which the parts are set is indicated on the diaphragm aperture scale 49 extending circumferentially on a smooth part of the periphery of the setting ring 42, and read in conjunction with a stationary reference mark or index point 50, conveniently marked on a portion of the stationary bayonet mounting ring 22. The shutter speed scale 52 is marked on the periphery of the speed setting ring 38, parallel to and approximately alongside of the scale 49, and is read by reference to the same pointer or reference point 50. Of course the circumferential relationship or orientation of the scale 52 with respect to the scale 49 varies whenever the ring 42 is turned relative to the ring 38 to change the exposure value, by moving the ring 42 axially forwardly so as to disengage the tooth 42a, as previously described.

The diaphragm aperture scale 49 can be omitted if desired, because the exposure value setting mechanism of the present invention (further described below) permits the operator to set the exposure value according to prevailing light conditions, and when this has been done the diaphragm aperture setting is of no further importance except as a guide to the depth of field or depth of definition, which can be sufficiently indicated by using a pair of depth of field indicating pointers sweeping over the focus distance scale 28a, thereby enabling the complete elimination of the diaphragm aperture scale since the depth of field pointers will convey all necessary information to the photographer. The depth of field pointers may be constructed and operated, for example, approximately as disclosed in the copending patent applications of Franz Singer, Serial No. 555,964, filed December 28, 1955 (issued March 1, 1960, as Patent 2,926,588), and Kurt Gebele, Serial No. 557,183, filed January 3, 1956.

Figure 5:
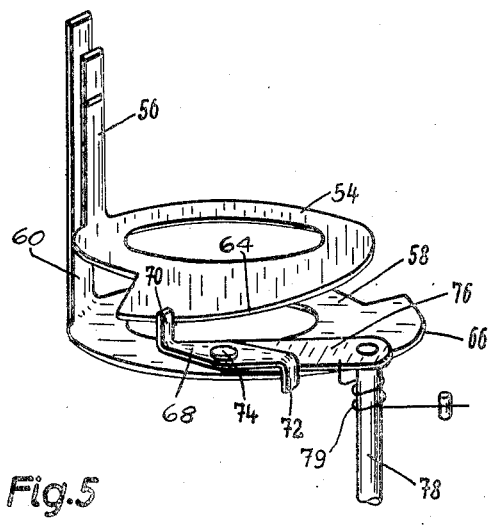
Fig. 5 is a perspective view of part of the transmission or control mechanism for transmitting the exposure value setting of the manipulatable member to the follow-up pointer of the exposure meter.

Setting of the parts to the desired exposure value may be accomplished by using an exposure value scale marked circumferentially on one of the two external rings 38 and 42, and a reference point on the other one of the rings. But preferably such setting, in the present embodiment of the invention, is effected by causing a so-called follow-up pointer to move to a position in alinement with or in other desired predetermined relation to the pointer of an exposure value meter, for instance a photoelectric exposure meter of known type and operation installed in the camera body. For this purpose, there is a cam ring 54 (Figs. 2 and 5) mounted for rotation about the optical axis near the rear of the shutter casing 18, and connected by forwardly extending arm 56 to the external shutter speed setting ring 38, so that the cam ring 54 is turned with the ring 38 and always assumes a rotary position corresponding to that of the ring 38. Spaced a little rearwardly from the cam ring 54 is a second cam ring 58 rotatable on a shoulder on the shutter casing 18 and likewise turning about the optical axis as a center. This second cam ring 58 has an arm 60 which extends forwardly and connects the cam ring to the diaphragm aperture adjusting ring 42, to turn therewith. The arm 60 may extend directly to the ring 42 or, preferably, extends to and connects with an intermediate ring 48 (Figs. 2 and 3) which may be called a slip ring or drag ring. This ring 48 rotates on the stationary part 22, and the forward end of the ring 48 has a notch or slot which receives the previously mentioned arm 42b of the ring 42, so that any rotary motion of the ring 42 is transmitted to the intermediate ring 48, and then from the intermediate ring 48 is transmitted to the arm 60 to the cam ring 58, which thus always occupies a position of orientation corresponding to that of the external setting ring 42.

The first mentioned cam ring 54 has an inclined cam surface 64 (Fig. 5) on part of its periphery, and the second cam ring 58 has an inclined cam surface 66 on part of its periphery, which is inclined in the opposite direction from the cam 64, so that if the two rings 54 and 58 are turned simultaneously in the same direction, the radial rise of one cam increases as the radial rise of the other cam decreases. The cams 64 and 66 respectively cooperate with a pivoted lever 68 having an upturned end 70 which bears against the cam 64 and a downturned end 72 which bears against the cam 66. The lever 68 is pivoted at its mid point at 74 to an arm 76 fixed to a shaft 78 which is influenced by a light spring 79 to hold the member 68 constantly against the cams. The shaft extends rearwardly, parallel to the optical axis, to a suitable point within the camera body, where it is connected by bevel gearing 80 to the preferably vertical shaft of a follow-up pointer 82 which sweeps horizontally just under the top wall of the camera body 10, the end of the pointer being visible through an arcuate window 84 through which is also seen the end of the pointer 86 of a photoelectric exposure meter or the like, of the usual moving coil galvanometer type, operated by current from a photoelectric cell 51 mounted in the front wall of the camera body 10 and provided, if desired, with a pivoted apertured mask or flap 53 which may be shifted to open or closed position for operating the exposure meter in high sensitivity or low sensitivity range, respectively.

The transmission mechanism comprising the cam rings 54 and 58 and the cams thereon and the lever 68, is constructed and operates substantially in the same manner as the corresponding parts of the mechanism in the copending patent application of Kurt Gebele, Serial No. 710,212, filed January 21, 1958, to which reference may be made for a further description and discussion. Briefly, if the two setting members 38 and 42 are turned simultaneously (which is the way they turn when normally coupled to each other) then the rise of one cam is substantially equal to the fall of the other, so that the lever 68 turns on its pivot 74 but the position of the pivot does not change. Thus the arm 76 does not move, the shaft 78 does not turn, and the pointer 82 is not moved, since no change in the exposure value of the shutter assembly is produced when the two rings 38 and 42 are turned simultaneously in the same direction. But if the ring 42 is displaced forwardly against the force of the springs 44, so as to uncouple it from the ring 38, and is turned independently of the ring 38, the cam 58, 66 will turn without rotary motion of the cam 54, 64, so that the lever 68 not only will swing on its pivot 74 but also will displace the position of the pivot, turning the arm 76 and the shaft 78 to swing the pointer 82 to a new position, corresponding to the new exposure value for which the shutter assembly is set.

When setting the shutter assembly to the desired exposure value, the ring 42 is turned (while in its forward position, disconnected from the ring 38) until the follow-up pointer 82 is alined with or in other desired relation to the pointer 86 of the exposure meter, thus setting the shutter speed and diaphragm aperture to a pair of values corresponding to the exposure value determined by the light meter or exposure meter. Then the ring 42 is allowed to move rearwardly under the influence of its springs 44 so that it again becomes coupled to the ring 38, after which the ring 42 may again be turned to any desired extent in order to select any other desired pair of available values of shutter speed and diaphragm aperture which represent the same exposure value. If the operator is to photograph a rapidly moving object, for example, he may turn the ring 42 (while coupled with the ring 38) to select a relatively fast shutter speed and a correspondingly large diaphragm aperture (small f number, or if the photographer is more interested in obtaining maximum depth of field than in the speed with which the exposure is made, he may turn the ring 42 (and the ring 38 with it) to select the desired small diaphragm aperture to achieve the desired great depth of field, with correspondingly slow shutter speed.

Because of the well known fact that the pointer of a photoelectric exposure meter moves in a non-linear manner with respect to changes in light value falling on the photocell of the meter, especially at the extreme ends of the scale, it is desirable to interpose an equalizing member between the shaft 78 and the follow-up pointer 82 so as to produce a non-linear motion of the pointer 82 corresponding to the non-linear motion of the exposure meter pointer 86.

The arms 56 and 60 of the cam rings 54 and 58, as well as various radial or other arms connecting one moving part to another, frequently have to pass through various walls or partitions of other parts. Of course suitable slots (usually arcuate slots) of necessary size and length are provided in the stationary parts to permit the movable arms or other movable parts to pass through. These slots or openings are omitted from the drawings of the present application, for the sake of simplicity, but will be readily understood by those skilled in the art.

It may be emphasized again that the outer surface of the shutter speed setting ring 38 is a substantially smooth cylindrical surface, with no finger pieces or other parts which can be grasped manually by the operator. The outer surface of the ring 42 may also be a substantially smooth cylindrical surface except for the conveniently located finger pieces or handles 42c, preferably two in number and located diametrically opposite each other. Thus there is no opportunity for the operator to become confused or to operate the parts incorrectly. He need not stop and think which ring to turn first, when setting the shutter assembly, nor need he shift his grasp from one ring to another, as is sometimes the case in other constructions. He simply grasps the obviously available and accessible finger pieces 42c, and operates the setting mechanism in a very simple, convenient, and quick manner. Indeed, even if he tries to turn the ring 38, he cannot do so, both because of its smooth periphery and also because the exposed part of this ring, between the front edge of the bayonet mount 22 and the rear edge of the ring 42, is so narrow that a person's fingers cannot make any effective grasping engagement with the ring 38.

A slightly different embodiment of the invention is illustrated in Fig. 6, to which reference is now made. This embodiment is the same as the previous one, except that in this case the axially movable setting device 42 must be moved rearwardly to uncouple it from the setting ring 38, instead of being moved forwardly as in the first embodiment.

For this purpose, the coupling between the setting members 38 and 42 is so developed that at the forward end of the ring 38, the coupling notches 38b have the intervening teeth extending radially inwardly toward the optical axis. One or more coupling teeth 48a are arranged on the intermediate slip ring or drag ring 48, which in this instance moves axially bodily with the ring 42, instead of being axially stationary as in the first embodiment. The springs 44a are now arranged to urge the rings 48 and 42 forwardly, rather than the previous arrangement in which the springs 44 urged the ring rearwardly. The forward end of the arm 60 of the cam ring 58 extends into an axial slot of the intermediate ring 48, which axial slot is sufficiently long so that the ring 48 is connected to the arm 60 at all times regardless of the axial movements of the ring 48.

When the finger pieces 42c of the ring 42 are grasped and moved rearwardly against the force of the springs 44a, the tooth 48a is moved rearwardly out of the transverse plane of the notches 38b, and then the ring 42 is free to turn without turning the ring 38, thereby adjusting the exposure value of the shutter assembly. When the rearward displacing force is removed, the springs 44a move the ring 42 forwardly again to its normal rest position, seating the tooth 48a in whichever one of the notches 38b was opposite it at that time. Then the two rings 38 and 42 are once more coupled to each other for conjoint rotation, to adjust the factors of shutter speed and diaphragm aperture in a complementary manner without changing the exposure value.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claim.

What is claimed is:

A photographic camera including a shutter assembly having an optical axis and a shutter speed setting ring and a diaphragm aperture setting ring both mounted externally on said assembly for rotation about said optical axis as a center, and disengageable coupling means for coupling one of said rings to the other for conjoint rotation, both of said rings having substantially smooth cylindrical outer surfaces, and one of said rings being of larger diameter than the other and partially overlying the forward edge thereof and being mounted for axial movement, axial movement thereof in one direction serving to disengage said coupling means so that said one of said rings may be rotated independently of the other to change an exposure value represented by the position of relative orientation of the two rings with respect to each other, axial movement of said one of said rings in the opposite direction serving to engage said coupling means so that both rings will rotate in unison without change of exposure value, characterized by the fact that said ring of larger diameter has grasping means projecting outwardly from the cylindrical surface thereof for easy grasping by fingers of an operator and by the fact that the ring of smaller diameter has no grasping means thereon and cannot be manually grasped except by its substantially smooth cylindrical surface, a mounting ring having a larger diameter than that of the ring of smaller diameter and partially overlying the rear edge thereof, the exposed portion of the ring of smaller diameter being relatively narrow so as to be substantially inaccessible for manual grasping and adjustment and further characterized by the fact that said shutter assembly includes a first part having bayonet connection lugs and a second detachable and interchangeable part having bayonet connection lugs connected to or disconnected from those of said first part by relative rotation about said optical axis through a fraction of a revolution, said two rings both being mounted on said first part and remaining therewith when said second part is removed, an internal diaphragm adjusting member rotatably mounted on said second part and remaining therewith when said second part is removed from said first part, an arm on said internal adjusting member, a spring tending to turn said internal adjusting member in the same direction in which said second part is turned when engaging its bayonet lugs with those of said first part, and an arm on said diaphragm aperture setting ring for engaging said arm on said internal adjusting member to determine the rotary position assumed by said internal adjusting member under the influence of said spring, the rotary range of movement of said second part when engaging its bayonet lugs with or disengaging them from the bayonet lugs of said first part being greater than the maximum rotary range of movement of said internal adjusting member and being so oriented with respect to said last mentioned range that during a disengaging rotary movement of said second part said arm on said internal adjusting member will always be shifted to a position out of contact with said arm on said diaphragm aperture adjusting ring regardless of the adjusted position of the latter.

References Cited in the file of this patent

UNITED STATES PATENTS 2,849,936     Fahlenberg _____ Sept. 2, 1958

FOREIGN PATENTS 310,855     Switzerland _____ Jan. 14, 1956

OTHER REFERENCES

German application Ser. No. K22,850, printed December 13, 1956.